United States Patent [19]

Shimizu et al.

[11] 4,203,838
[45] May 20, 1980

[54] PROCESS FOR THE TREATMENT OF SLUDGE

[75] Inventors: Koh Shimizu; Terumi Uchimura; Ken-Ichi Uede; Katuyoshi Nakamura, all of Osaka, Japan

[73] Assignee: Kubota Tekko Kabushiki Kaisha, Osaka, Japan

[21] Appl. No.: 967,877

[22] Filed: Dec. 8, 1978

Related U.S. Application Data

[63] Continuation of Ser. No. 775,599, Mar. 8, 1977, abandoned.

[30] Foreign Application Priority Data

Mar. 13, 1976 [JP] Japan .................................. 51-27331
Jun. 16, 1976 [JP] Japan .................................. 51-71635

[51] Int. Cl.² ............................................. C02C 3/00
[52] U.S. Cl. .............................. 210/63 R; 210/63 Z; 210/73 S
[58] Field of Search ..................... 210/10, 63 R, 63 Z, 210/67, 71, 60, 73 S; 423/242

[56] References Cited

U.S. PATENT DOCUMENTS

| | | | |
|---|---|---|---|
| 1,271,899 | 7/1918 | Howard | 423/242 |
| 3,256,179 | 6/1966 | Teletzke et al. | 210/10 |
| 3,660,277 | 5/1972 | McWhirter et al. | 210/63 Z |
| 3,661,778 | 5/1972 | Pradt | 210/63 R |
| 3,697,417 | 10/1972 | Teletzke et al. | 210/10 |
| 3,824,186 | 7/1974 | Erickson et al. | 210/10 |
| 3,849,536 | 11/1974 | Morgan | 210/63 R |
| 3,920,506 | 11/1975 | Morgan | 210/63 R |

*Primary Examiner*—Thomas G. Wyse
*Attorney, Agent, or Firm*—Wenderoth, Lind & Ponack

[57] ABSTRACT

Process for treating sewage sludge at relatively low temperatures below 165° C. under pressure. The sludge is heat treated in a reactor in which it is brought into close, uniform contact with air with the discharge of air bubbles from the reactor effectively prevented. The liquor separated from the treated sludge is treated by two steps of the activated sludge process. The malodorous gas produced during the treatment of sludge is also deodorized or incinerated. A fully closed treatment process is provided which does not cause any secondary pollution problem.

3 Claims, 8 Drawing Figures

4,203,838

PROCESS FOR THE TREATMENT OF SLUDGE

This is a continuation of application Ser. No. 775,599, filed Mar. 8, 1977, abandoned.

The present invention relates to an improved sludge treatment process, and particularly to a pressing lower-temperature heat-treatment process for sludge containing organic material and apparatus for carrying out said process.

A sludge treatment process is known which subjects sewage sludge containing organic material to heat treatment in a reactor at relatively low temperatures below 165° C. by blowing steam and compressed air thereinto to keep the reactor in an oxidizing atmosphere. In such a process the volume of air blown into the reactor is more than the theoretical value required to reduce COD of sludge by 2–4% and is 10 to 30 times the volume of the sludge being treated, the volume of steam being controlled to keep below 165° C. the reaction temperature, which is detected as by a thermocouple provided in the reactor.

Developed to solve problems associated with the high-temperature or porteous process using higher temperatures of about 200° C., such as the syneresis of sludge, strong malodor of separated gas, seizure of organic matter in the heat exchanger, this pressing lower-temperature process can improve the filtrability or dewatering characteristics of sludge in spite of relatively low reaction temperatures, thereby increasing sludge treatment efficiency. High pressure and high temperature as in the conventional process such as the Zimmerman process are not required.

Also known from the Japanese patent applications Nos. 49-13985, 49-53719 and 49-137339, for example, is a sludge treatment process in which the sludge to be treated is preheated in a heat exchanger before being heat-treated in the reactor with steam and compressed air, the heat-treated sludge being used as a heat source for the heat exchanger.

However, these known processes had the following problems:

(1) Air blown into the reactor rises in the form of large air bubbles and not uniformly but sometimes at only one side thereof. Therefore, satisfactory contact of sludge with air was not achieved, thus impairing the efficiency of heat treatment.

(2) The gas separated in the reactor is discharged in the form of bubbles through the exhaust pipe at top thereof, causing such problems as pipe chokage, corrosion and wear.

(3) The conventional process was not suited for the treatment of separated liquor in the pressing lower-temperature process.

(4) Chemicals were used to deodorize the malodorous gas produced in the sludge treatment plant. This deodorizing process was uneconomical.

An object of this invention is to provide an improved all-round closed process for the pressing lower-temperature treatment of organic sludge, said process including not only the heat treatment of sludge in the reactor but also the treatment of separated liquor and the deodorization of malodorous gas produced in the process not to discharge any harmful waste gas or liquor.

Another object of this invention is to provide a reactor having perforated plates with ribs secured to the underside thereof to improve the contact of sludge with air.

A further object of this invention is to provide a reactor provided with means for preventing air bubbles from being discharged out of the reactor.

A still further object of this invention is to provide an efficient system for the treatment of supernatant liquor from the heat-treated sludge thickener and the filtrate from the dewatering system.

An additional object of this invention is to provide a rational waste gas and liquor treatment process combining the deodorization of malodorous gas from the aeration tanks, sludge thickener and filter press with the disposal of waste liquor from a desulfurizing tower for the disposal of exhaust gas from the incinerator.

Other objects and advantages of this invention will become apparent from the following description and the accompanying drawings, in which.

Figure 1:
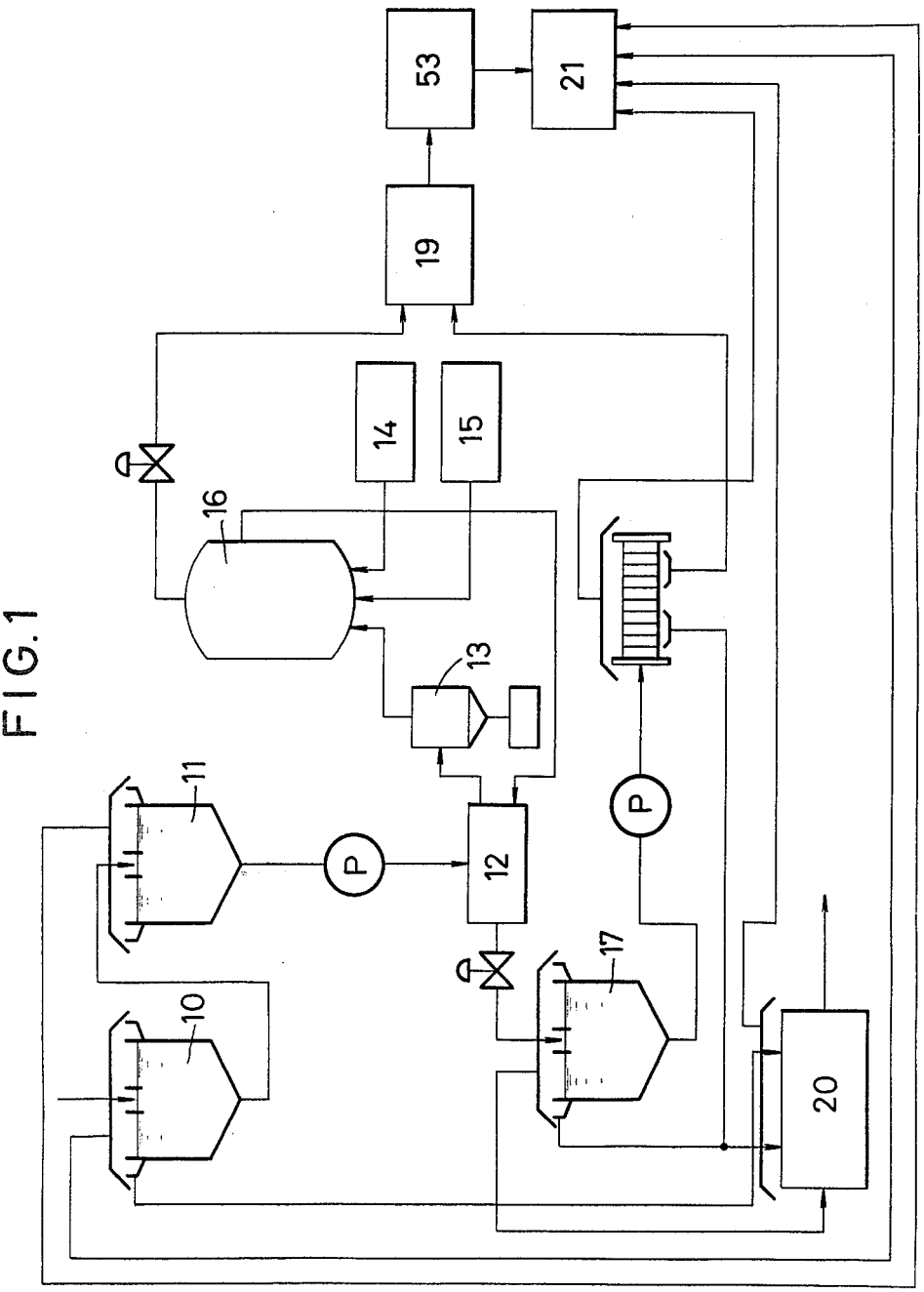
FIG. 1 is a flow sheet of a sludge treatment plant embodying the present invention.

Referring to FIG. 1, the mixed raw sludge pumped from the preliminary and final settling ponds in a sewage treatment plant is first thickened in a raw sludge thickener 10 until the concentration of solid matter in the sludge decreases down to 3.5–4%. After being screened to remove foreign matters to prevent the chokage of pumps, pipes and heat exchanger, the thickened sludge is stored in a thickened sludge tank 11 from which it is pumped to a heat exchanger 12. The latter is a double pipe, the untreated sludge being passed through its inner pipe and the heat-treated sludge from a reactor 16 being fed through its outer pipe in the opposite direction to preheat the untreated sludge up to about 120° C. by indirect heat exchange. Some heat medium such as water may be used to recover the heat of the heat-treated sludge and preheat the untreated sludge.

The preheated sludge has sand removed by a sand remover 13 of a cyclone type to prevent the wear of component devices located downstream. The sand-removed sludge is forced into the reactor 16 from the bottom thereof together with steam from a boiler 14 and compressed air from a compressor 15. By heat treatment for 30 minutes or longer at 130°–165° C. under a pressure of about 10 kg/cm$^2$ so as to bring it into close contact with air, the filtrability of sludge is improved. The gas separated from the sludge in the reactor 16 is burned in an incinerator 19.

The heat-treated sludge is discharged from the reactor 16 through its sludge discharge pipe and passed through the heat exchanger 12 for heat recovery as mentioned above so that it cools down to about 60° C. The sludge is then allowed to settle in a heat-treated sludge thickener 17 where it separates by natural settling into supernatant liquor and thickened sludge. The thickened sludge is pumped to a dewatering means such as a filter press 18 where it is filtered under pressure. The filter cake is burned to ashes in the incinerator 19 with a waste heat boiler. The heat value of the sludge cake is recovered in the form of steam in the waste heat boiler, said steam being used as the heat source for heat treatment in the reactor.

The separated liquor consisting of the supernatant liquor in the thickener 17 and the filtrate from the filter press 18 is subjected to biological treatment in a separated liquor treatment system 20 which will be detailed later. The treated liquor is sent back to an ordinary water treatment plant.

The reactor 16, raw sludge thickener 10, thickened sludge tank 11, heat-treated sludge thickener 17, filter press 18 and aeration tanks in the separated liquor treatment system 20 are major sources of malodorous gas in this sludge treatment plant. The gas from the reactor 16 is burned in the incinerator 19 and that from the heat-treated sludge thickener 17 is used for aeration in the separated liquor treatment system 20. The gas from other sources, which is less malodorous, is led to a deodorizing system 21 which will be detailed later.

The exhaust gas from the incinerator 19 is treated in a desulfurizing tower 53 to remove the sulfurous acid ($SO_2$) gas contained therein. The waste liquid from said tower is used in the deodorizing system 21.

Figure 2:
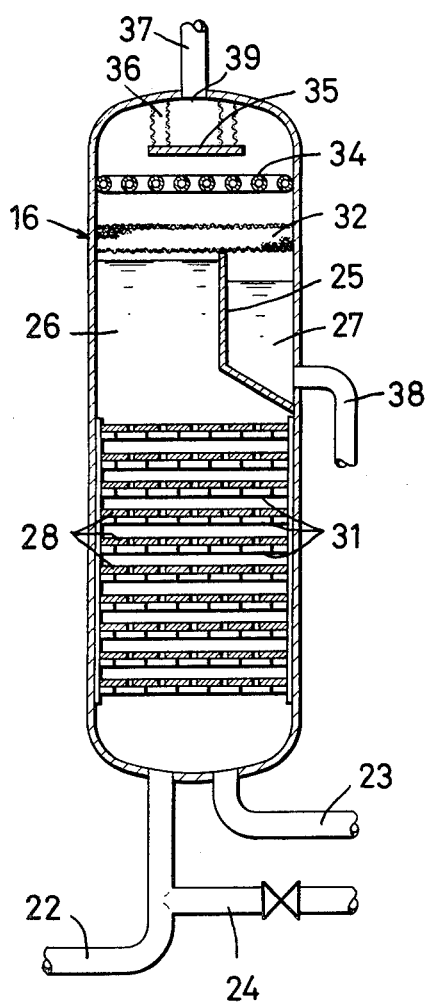
FIG. 2 is a vertical sectional view of one form of the reactor according to this invention.

Referring to FIG. 2, the sludge from the sand remover 13 is fed into the reactor 16 through a pipe 22. At the same time, steam and compressed air are blown into the reactor through pipes 23 and 24, respectively. The reactor 16 is provided at its upper portion with a partitioning plate 25 to divide the space therein into an oxidizing chamber 26 and a heat condensing chamber 27.

Figure 3:
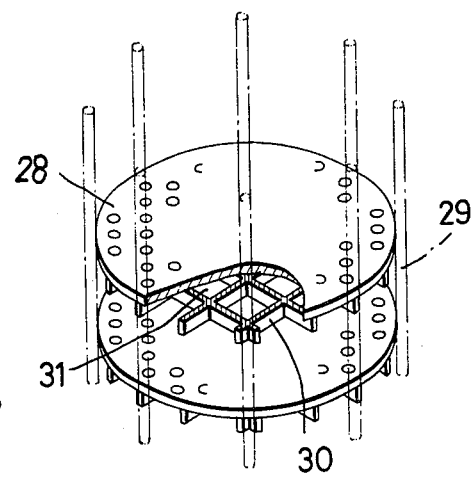
FIG. 3 is a partially cutaway perspective view of the perforated plates with ribs provided in the reactor.

In the former chamber and below the partitioning plate are arranged a plurality of perforated plates 28 in tiers horizontally and suitably spaced therebetween. For regular spacings, said plates may be preferably mounted in the reactor 16 after welding them to a plurality of vertical coupling bars 29 disposed at the periphery thereof (FIG. 3).

Figure 4:
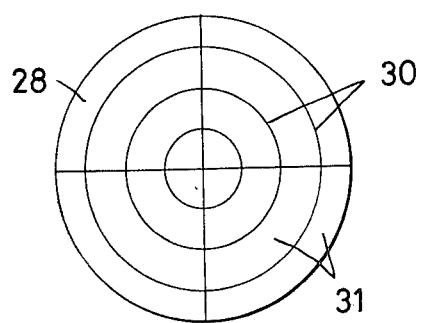
FIGS. 4 and 5 are bottom views of other forms of ribs secured to said perforated plates.
Figure 5:
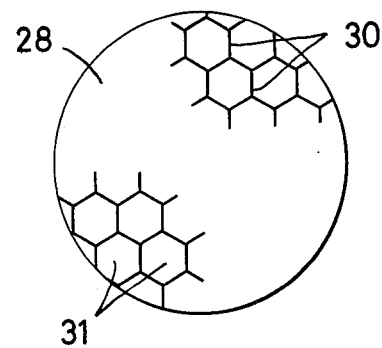

A rib 30 is secured as by welding to the underside of each perforated plate 28. The rib may be in the form of a lattice as in FIG. 3, concentric circles combined with a cross as in FIG. 4, or a honeycomb as in FIG. 5. In any cases, a plurality of air reservoirs 31 are formed at the underside of each rib 30.

Figure 6:
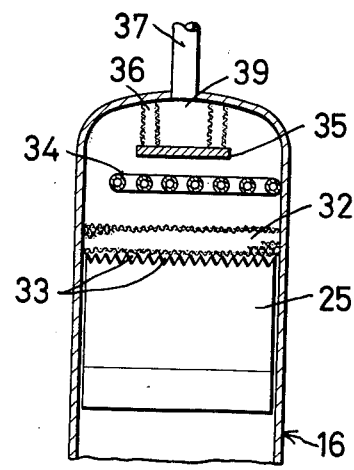
FIG. 6 is a vertical sectional view of a portion of the reactor shown in FIG. 2.

A demister 32 formed by a plurality of wire gauges put one upon another is horizontally mounted on the partitioning plate 25 which is formed with a plurality of V-shaped notches 33 in its upper edge (FIG. 6). Above the demister 32 is horizontally mounted a steam heating coil 34 which is spiral-shaped in this embodiment, but may be zigzag- or lattice-shaped.

A separated gas outlet 39 also is covered with a tubular demister 36 similarly formed by wire gauges with its lower end closed by an end plate 35. The gas separated in the reactor 16 flows through the demister 32 into an exhaust pipe 37 provided with a pressure adjusting valve.

As the compressed air blown into the reactor 16 together with the sludge rises therein in the form of air bubbles while subjecting the sludge to partial oxidation, these air bubbles enter each air reservoir 31 formed under each rib 30 and pass through the perforations in each perforated plate 28. Even if said plates are not mounted in a correct horizontal position, air bubbles would be well distributed into the air reservoirs 31 without gathering at only one side of the reactor 16. Thus, this arrangement ensures a uniform mixing of air with the sludge.

After passing through the perforated plates 28, the sludge overflows the partitioning plate 25 into the heat condensing chamber 27 where it is heat condensed in an oxygen-deficient standing condition. Even though the demister 35 is mounted on the partitioning plate 25, it does not obstruct the flow of sludge because of the V-shaped notches 33 formed in the top edge thereof. The sludge thus treated is discharged through an automatic discharge valve (not shown) from a pipe 38. This heat treatment in the reactor 16 subjects the sludge to partial oxidation and separates it into gas and solids, thereby improving its filtrability. The separated gas is taken out through the pipe 37 to the incinerator 19.

As the separated gas passes the demister 32, almost all of the bubbles are broken. Even if any of them pass it, they will burst upon contact with the steam heating coil 34. Should any bubbles survive, they would break at the second demister 36. This arrangement ensures that no bubbles are discharged through the exhaust pipe 37.

Figure 7:
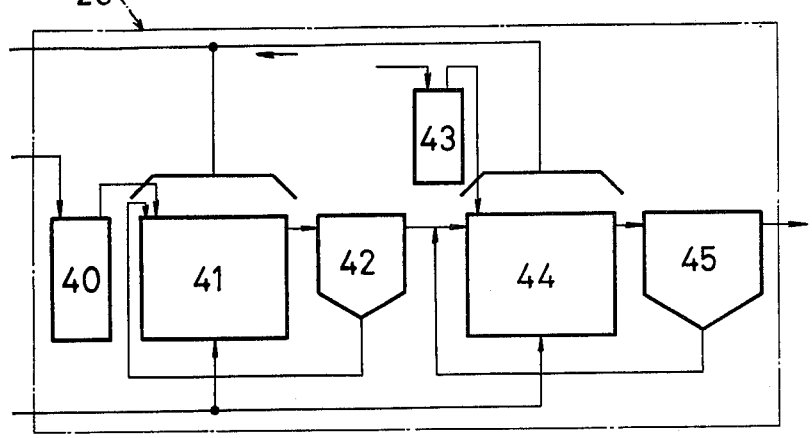
FIG. 7 is a flow sheet of one form of the separated liquor treatment system according to this invention.

Next, the liquor treatment system 20 shown in FIG. 7 will be described in detail.

The supernatant liquor in the heat-treated sludge thickener 17 and the filtrate from the dewatering system such as the filter press 18 are called the separated liquor. Generally, the separated liquor produced in the lower-temperature process has much lower BOD and COD and chromaticity in comparison with that produced in the high-temperature process due to the fact that the reaction temperature is lower and the reactor is kept in an oxidizing atmosphere. The COD and BOD of the former are $\frac{1}{3}-\frac{2}{3}$ of those of the latter and the chromaticity is 1/6–1/5. Also, analysis by gel chromatography shows that the separated liquor in the lower-temperature process is hardly decomposed by heat treatment, retaining the characteristics akin to those of raw sludge. Therefore, it can be easily treated by the activated sludge process.

The liquor from the thickener 17 and the press filter 18 is first allowed to settle in a first adjusting tank 40 and then aerated with activated sludge in a first aeration tank 41. Preferably, a BOD loading of about 1.2–2.0 kg/m³/day and a mixed liquor suspended solid (MLSS) concentration of 4000–6000 ppm are used for the first aeration tank 41.

The treated liquor is then allowed to separate into solids and liquid in a first settling tank 42 from which part of the sludge is fed back to the first aeration tank 41. Tests show that BOD of the liquor from the first aeration tank 41 is 100–150 ppm on the average, which means a removal rate of more than 95%. However, further decrease in BOD is unexpectable owing to the effect of COD and the lack of nourishment.

Thus, the liquor is then diluted about threefold with raw sewage in a second aeration tank 44. As the raw sewage the supernatant liquor from the raw sludge thickener 10 is used in this embodiment. It is fed through a second adjusting tank 43. The liquor is then subjected to a standard activated sludge treatment once again.

The liquor from the second aeration tank 44 is allowed to settle in a second settling tank 45, the supernatant liquor from which is fed to a water disposal system (not shown). Part of the sludge in the second settling tank 45 is also fed back to the second aeration tank 44. As the aeration air for the first and second aeration tanks, the malodorous gas from the heat-treated sludge thickener 17 is used also to deodorize it (FIG. 1).

Where higher grade of treatment is required, further treatment stages such as coagulation or filtration with sand or activated charcoal may be naturally provided after the second settling tank 45.

This process provides almost complete biological treatment of the separated liquor by two-step aeration with activated sludge. It also provide a simplified and totally closed treatment system with high efficiency by using the liquor from the raw sludge thickener 10 as the nourishment source.

Figure 8:
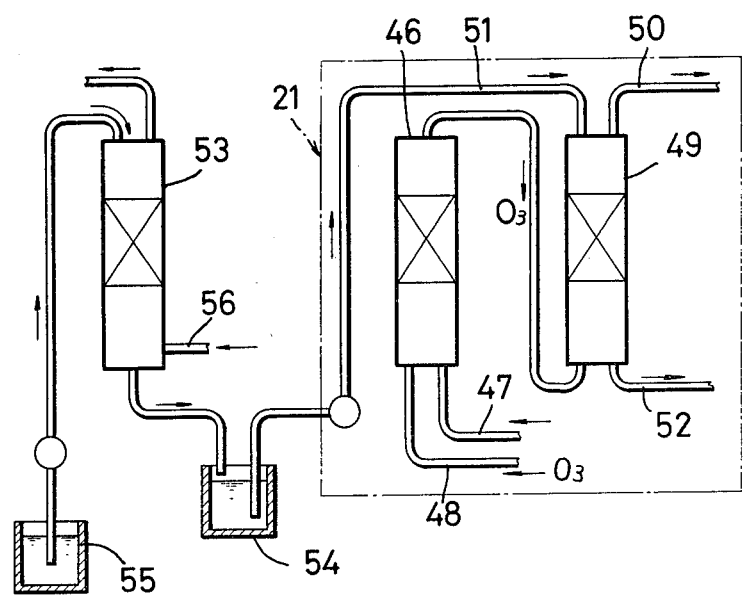
FIG. 8 is a partially sectional front view of one form of the deodorizing system according to this invention.

Finally, the deodorizing system 21 shown in FIG. 8 will be described.

Generally, in the lower-temperature sludge treatment process, the exhaust gas contains little malodour coming from sulfides such as hydrogen sulfide ($H_2S$) and methyl sulfide because sludge is partially oxidized in the reactor. Also, the odor of the heat-treated sludge is much less offensive than that in the high-temperature process because almost all malodorous components are removed from the reactor in the form of the separated gas, which is directly burned in the incinerator 19 because of its highly offensive odor.

Relatively less malodorous gas from the raw sludge thickener 10, thickened sludge tank 11, press filter 18 and aeration tanks 41 and 44 is introduced into a deodorizing tower 46 through a pipe 47. The tower is also supplied with ozone ($O_3$) from an ozone generator (not shown) through a pipe 48 to oxidize the malodorous components in said gas.

The deodorized gas containing residual ozone is taken from the top of the tower 46 and led to the bottom of an ozone removing tower 49 where the residual ozone therein serves to treat the waste liquid containing $Na_2SO_3$ fed from the desulfurizing tower 53 through a collecting tank 54. The treated gas and the waste liquid containing $Na_2SO_4$ are discharged therefrom through ducts 50 and 52, respectively.

The desulfurizing tower 53 serves to remove the sulfurous acid in the exhaust gas from the incinerator 19 with caustic soda (NaOH) solution pumped up from a tank 55 and supplied from top thereof. The exhaust gas from the incinerator is introduced into the tower 53 through a duct 56 and is contacted with the caustic soda for desulfurization. The desulfurized gas is discharged from the top thereof and the waste liquid containing $Na_2SO_3$ flows down into the tank 54.

All of the above-mentioned three towers 46, 49 and 53 are filled with some anti-corrosive synthetic material at their middle portion to prevent the gas from passing them through too quickly for effective treatment.

This deodorizing process is much more economical than the conventional one using chemicals and is particularly suited for sludge treatment plants with an incinerator.

The advantages of the pressing lower-temperature process according to this invention will be summarized below.

(1) It provides a totally closed system which combines the treatments of exhaust gas, liquor and solids into one. There is no possibility of causing any secondary pollution problems.

(2) Close, uniform contact off sludge with air is assured by the provision of perforated plates with ribs. This makes possible heat treatment of sludge at relatively low temperatures. The size of the reactor can be reduced because of higher reaction efficiency.

(3) Complete separation of gas from liquid in the reactor prolongs the working life of the pressure adjusting valve provided in the gas exhaust pipe of the reactor. Also, the temperature in the incinerator does not have to be so high.

(4) Low BOD of the separated liquor makes it possible to treat it by the ordinary biological treatment process.

(5) No oxidizing system is needed for the waste liquid from the desulfurizing tower since it is treated with the residual ozone in the exhaust gas from the deodorizing tower.

While a preferred embodiment of the invention has been described, it is to be understood that changes and variations may be made without departing from the scope of the following claims.

What is claimed is:

1. A process for treating sludge comprising the steps of:
   (1) introducing raw sludge into a raw sludge thickener to thicken said sludge and producing raw sewage as a supernatant;
   (2) transferring said thickened sludge into a thickened sludge storage tank to store said thickened sludge;
   (3) transferring the thickened sludge from the thickened sludge storage tank into a heat exchanger to preheat the sludge;
   (4) feeding the preheated sludge along with steam and compressed air into a reactor to oxidize and heat-condense the sludge at 130°–165° C. under a pressure of about 10 kg/cm$^2$ for at least 30 minutes while separating malodorous gas therefrom, thereby improving the filterability of the sludge;
   (5) transferring the sludge treated in step (4) through said heat exchanger to be used as a direct or indirect source of heat to preheat the untreated sludge, said treated sludge being transferred through the heat exchanger by means of a conduit which separates the treated from the untreated sludge;
   (6) transferring the treated sludge from the heat exchanger to a heat-treated sludge thickener tank to settle the treated sludge and permit it to separate into a thickened sludge and a supernatant liquor;
   (7) feeding the thickened sludge into a filter press to filter and remove liquid from the thickened sludge by means of pressure so as to form a cake and a filtrate;
   (8) transferring the supernatant liquor from the heat-treated sludge thickener tank and the filtrate from the filter press into a biological treatment system;
   (9) subjecting the supernatant liquor and the filtrate in said biological treatment system to a biological treatment by at least one step of the activated sludge process in which raw sewage is added from the raw sludge thickener and discharging the final effluent thus produced;
   (10) incinerating the malodorous gas from the reactor and the cake from the filter press by conveying said malodorous gas and said cake by separate means into an incinerator;
   (11) said process being such that malodorous gases are produced in the raw sludge thickener, the thickened sludge storage tank, the heat-treated sludge thickener tank, the filter press and the biological treatment system during the aforementioned treatment steps, and wherein such malodorous gases are deodorized by contacting them with ozone produced by an ozone generator by conveying these malodorous gases by separate means into a deodorizing system containing ozone therein;

(12) said incinerator being characterized by giving off an exhaust gas produced from the inicineration of the malodorous gases in step (10), said exhaust gas containing sulfurous gas, which sulfurous gas is removed from the exhaust gas by means of sodium hydroxide in a desulfurizing step to produce sodium sulfite; and

(13) feeding the deodorized gas from step (11) into an ozone removing tower to remove any unreacted ozone and contacting the unreacted ozone with sodium sulfite produced in step (12) above while discharging the deodorized gases.

2. A process according to claim 1, wherein the reactor used in step (4) is characterized by having a plurality of perforated plates arranged horizontally therein in tiers suitably spaced, a partitioning plate mounted above said perforated plates to divide said reactor into an oxidizing chamber and a heat condensing chamber, and means for preventing bubbles from being discharged therefrom with the separated gas, and wherein each of said perforated plates has a rib secured to the underside thereof to distribute air bubbles for uniform contact of the sludge with air.

3. A process according to claim 1, wherein the heat exchanger is a double pipe system containing a smaller pipe located concentrically within a larger pipe whereby the untreated sludge passes through the smaller pipe and the heat-treated sludge passes through the large pipe in counter-flow to the untreated sludge.

* * * * *